US010394065B2

United States Patent
Lim et al.

(10) Patent No.: US 10,394,065 B2
(45) Date of Patent: Aug. 27, 2019

(54) LIQUID CRYSTAL DISPLAY DEVICE COMPRISING A GUIDE MOLD HAVING FIRST AND SECOND PROTRUSIONS EXTENDING TOWARD ONE ANOTHER WITHOUT BEING DIRECTLY CONNECTED WITH EACH OTHER

(71) Applicant: LG Display Co., Ltd., Seoul (KR)

(72) Inventors: Hyun-Kyo Lim, Paju-si (KR); Young-Ki Song, Paju-si (KR); Sun-Bok Song, Ansan-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/842,370

(22) Filed: Dec. 14, 2017

(65) Prior Publication Data

US 2018/0173044 A1    Jun. 21, 2018

(30) Foreign Application Priority Data

Dec. 20, 2016  (KR) .................. 10-2016-0174438

(51) Int. Cl.
*G02F 1/1333*  (2006.01)
*F21V 8/00*  (2006.01)
*G02F 1/1335*  (2006.01)

(52) U.S. Cl.
CPC ....... *G02F 1/133308* (2013.01); *G02B 6/009* (2013.01); *G02B 6/0031* (2013.01); *G02B 6/0051* (2013.01); *G02B 6/0085* (2013.01); *G02F 1/133615* (2013.01); *G02B 6/0055* (2013.01); *G02B 6/0068* (2013.01); *G02B 6/0088* (2013.01); *G02B 6/0091* (2013.01); *G02F 2001/133317* (2013.01); *G02F 2202/28* (2013.01)

(58) Field of Classification Search
CPC .................. G02B 6/0091; G02F 2001/133317
See application file for complete search history.

(56) References Cited

U.S. PATENT DOCUMENTS

| 8,164,709 B2 | 4/2012 | Chen |
| 8,939,633 B2 | 1/2015 | Yabe et al. |
| 2007/0211191 A1* | 9/2007 | Cho ..................... G02B 6/0073 349/58 |

(Continued)

FOREIGN PATENT DOCUMENTS

| KR | 20160044174 | 4/2016 |
| TW | I223115 B | 11/2004 |

(Continued)

OTHER PUBLICATIONS

Taiwan Intellectual Property Office, Office Action, Taiwanese Application No. 106144017, dated May 23, 2018, seven pages.

*Primary Examiner* — Paul C Lee
(74) *Attorney, Agent, or Firm* — Fenwick & West LLP (57) ABSTRACT

An LCD includes: a liquid crystal panel; a light guide plate disposed under a liquid crystal panel; a reflection plate under the light guide plate; a light emitting diode (LED) assembly including an LED facing a light incidence surface of the light guide plate and a printed circuit board (PCB) mounted on a lower surface of the LED; and a graphite film configured to surround an upper surface and an outer side surface of the LED assembly and a lower surface of the reflection plate.

3 Claims, 5 Drawing Sheets

(56) References Cited

U.S. PATENT DOCUMENTS

| | | | |
|---|---|---|---|
| 2008/0043171 A1* | 2/2008 | Takahashi | G02B 6/0083 349/65 |
| 2008/0291356 A1* | 11/2008 | Kim | G02B 6/0088 349/58 |
| 2009/0058306 A1* | 3/2009 | Itaya | G02B 6/0011 315/149 |
| 2009/0180054 A1 | 7/2009 | Chen | |
| 2010/0149834 A1* | 6/2010 | Kim | G02B 6/0068 362/612 |
| 2012/0002437 A1 | 1/2012 | Yabe et al. | |
| 2014/0085564 A1 | 3/2014 | Hendren et al. | |

FOREIGN PATENT DOCUMENTS

| | | |
|---|---|---|
| TW | 200931122 A | 7/2009 |
| TW | 201219922 A | 5/2012 |

* cited by examiner

LIQUID CRYSTAL DISPLAY DEVICE COMPRISING A GUIDE MOLD HAVING FIRST AND SECOND PROTRUSIONS EXTENDING TOWARD ONE ANOTHER WITHOUT BEING DIRECTLY CONNECTED WITH EACH OTHER

CROSS-REFERENCE TO RELATED APPLICATIONS

The present application claims the priority benefit of Korean Patent Application No. 10-2016-0174438, filed on Dec. 20, 2016, in the Korean Intellectual Property Office, which is hereby incorporated by reference in its entirety for all purposes as if fully set forth herein.

BACKGROUND

Technical Field

The present disclosure relates to a liquid crystal display device (LCD), and more particularly, to an LCD capable of effectively implementing a narrow bezel.

Discussion of the Related Art

As an information society develops, the demand for display devices for displaying images has been increasing in various forms. Recently, various flat display devices such as liquid crystal display devices (LCDs), plasma display panels (PDPs) and organic light emitting diode (OLED) devices have been utilized.

Among the flat panel display devices (FPD), LCDs are widely used because of the advantages of miniaturization, weight reduction, thinness, and low power driving.

Figure 1:
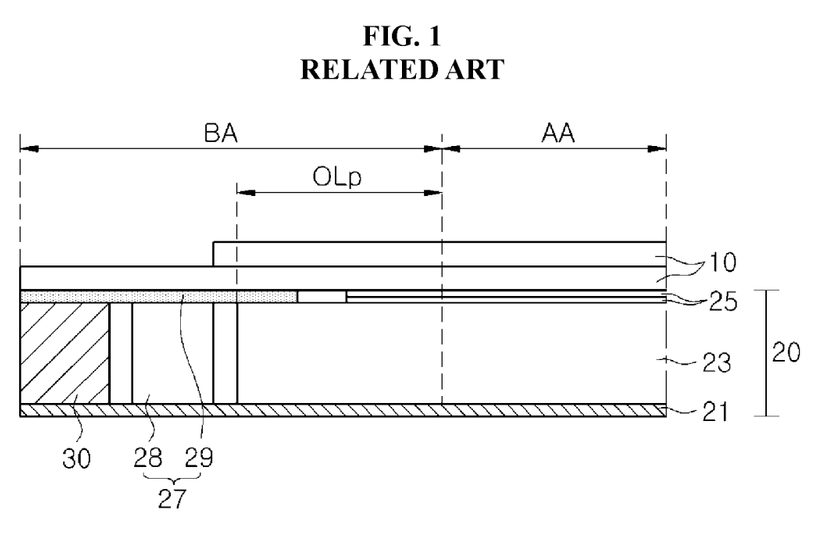
FIG. 1 is a cross-sectional view schematically illustrating a liquid crystal display device (LCD) according to the related art.

FIG. 1 is a cross-sectional view schematically illustrating an LCD according to the related art.

Referring to FIG. 1, the related art LCD may include a liquid crystal panel 10, a backlight unit 20, and a guide mold 30.

The backlight unit 20 includes a reflection plate 21, a light guide plate 23, an optical sheet 25, and an LED assembly 27. In addition, the LED assembly 27 may be composed of a printed circuit board (PCB) 29 and a plurality of LEDs 28 mounted on a lower surface of the PCB 29 to be spaced apart by a predetermined interval.

The guide mold 30 has a rectangular frame shape and is configured to surround four side surfaces of the edges of the backlight unit 20 to support the backlight unit 20.

The guide mold 30 is attached and fixed to an upper surface of an edge of the reflection plate 21. Furthermore, the guide mold 30 is located behind the plurality of LEDs 28 on a light-incident portion at which the plurality of LED 28 are disposed, and the lower surface of the PCB 29 is attached to and fixed to the guide mold 30.

However, in the related art LCD having such a structure, since there is a limit to reducing a width of a bezel area BA outside a display area AA in the light-incident portion, it is difficult to implement a narrow bezel.

In this regard, since the guide mold 30 configured to fix the LED assembly 27 is located in the light-incident portion, the width of the bezel area BA is increased by the guide mold 30 and it is difficult to implement a narrow bezel.

In addition, an optical distance OLp (i.e., a distance at which light emitted from adjacent LEDs 28 is mixed) from the light incident surface of the light guide plate 23 to the display area AA may be also be included in the width of the bezel area BA. Since there is a limit to reducing a distance between the LEDs 28 due to a wiring design of the PCB 29 and attachment characteristics between the PCB 29 and the guide mold 30, there is also a limit to reducing the optical distance OLp.

SUMMARY

Accordingly, the present invention is directed to a liquid crystal display device that substantially obviates one or more of the problems due to limitations and disadvantages of the related art.

An advantage of the present invention is to provide a liquid crystal display device that can effectively implement a narrow bezel.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, an LCD includes: a liquid crystal panel; a light guide plate disposed under the liquid crystal panel; a reflection plate under the light guide plate; a light emitting diode (LED) assembly including an LED facing a light incidence surface of the light guide plate and a printed circuit board (PCB) mounted on a lower surface of the LED; and a graphite film configured to surround an upper surface and an outer side surface of the LED assembly and a lower surface of the reflection plate.

BRIEF DESCRIPTION OF THE DRAWINGS

The accompanying drawings, which are included to provide further understanding of the disclosure, are incorporated in and constitute a part of this specification, illustrate implementations of the disclosure, and, together with the description serve, to explain the principles of embodiments of the disclosure.

DETAILED DESCRIPTION

Reference will now be made in detail to embodiments of the present disclosure, examples of which are illustrated in the accompanying drawings. In the following description, when a detailed description of well-known functions or configurations related to this document is determined to unnecessarily obscure the gist of an embodiment of the disclosure, the detailed description will be omitted. The progression of processing steps and/or operations described is an example, and the sequence of steps and/or operations is not limited to that set forth herein and may be changed as is known in the art, with the exception of steps and/or operations necessarily occurring in a certain order. Like reference numerals designate like elements throughout. Names of respective elements used in the following explanations are selected only for convenience of writing the specification, and thus may be different from those used in actual products.

Hereinafter, embodiments of the present disclosure will be described with reference to the drawings.

First Embodiment

Figure 2:
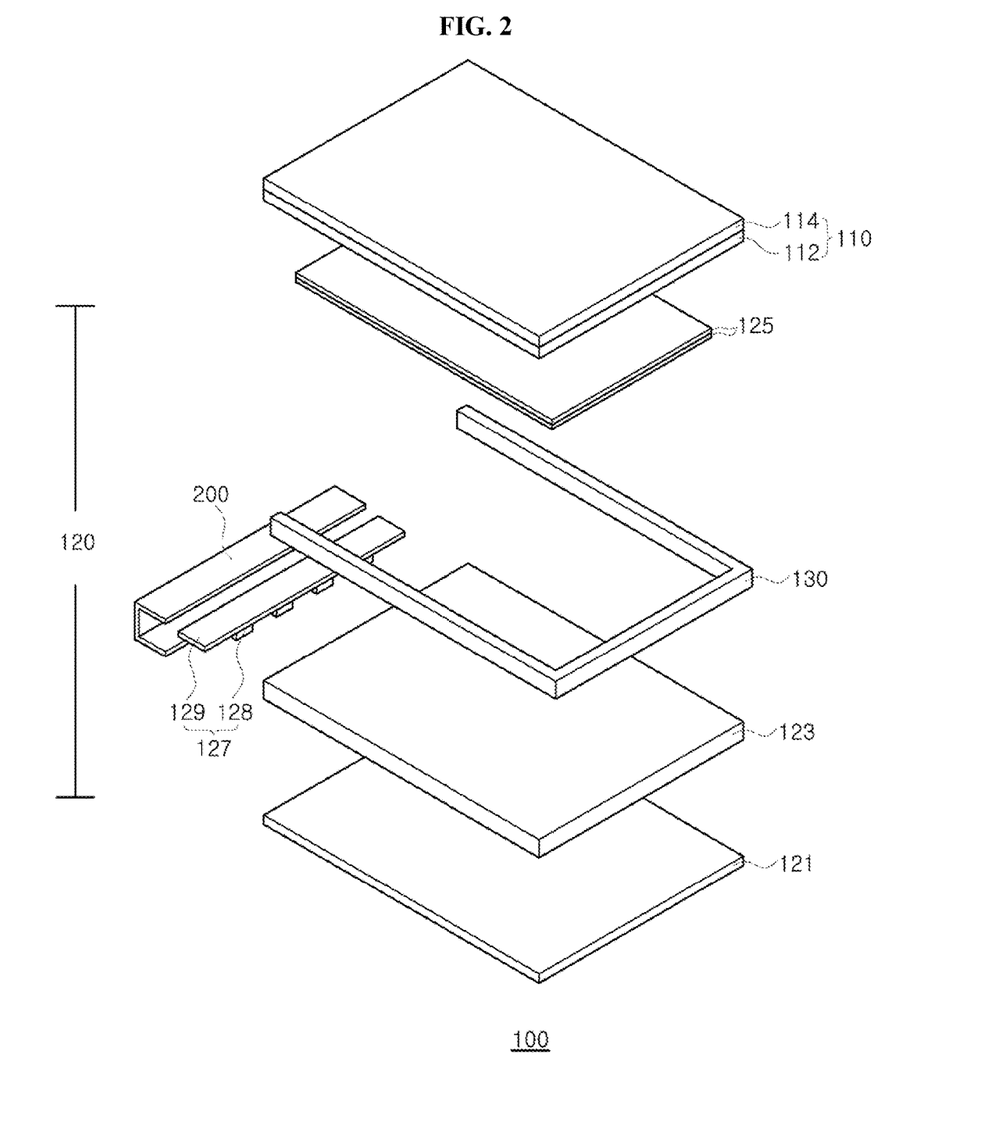
FIG. 2 is an exploded perspective view schematically illustrating an LCD according to an embodiment of the present disclosure.

FIG. 2 is an exploded perspective view schematically illustrating a liquid crystal display device (LCD) according to a first embodiment of the present disclosure.

As illustrated in FIG. 2, an LCD 100 according to the first embodiment of the present disclosure may include a liquid crystal panel 110, a backlight unit 120, a guide mold 130, and a graphite film 200.

The liquid crystal panel 110 configured to display an image may include first and second substrates 112 and 114 bonded to face each other, and a liquid crystal layer (not shown) interposed between the first and second substrates 112 and 114.

Although not illustrated in detail, on an inner surface of the first substrate 112, which is called a lower substrate or an array substrate, a plurality of gate lines and data lines cross each other to define pixels, and a thin film transistor connected to a gate line and a data line corresponding to each of the pixels, and a pixel electrode connected to the thin film transistor may be formed.

Furthermore, on an inner surface of the second substrate 114, which is called an upper substrate or a color filter substrate, as a counter substrate facing the lower substrate, a color filter pattern corresponding to each of the pixels, and a black matrix enclosing the color filter pattern and covering a non-display element such as a gate line, a data line, and a thin film transistor may be formed.

At this time, as the liquid crystal panel 110, all kinds of liquid crystal panels may be used. For example, all types of liquid crystal panels such as an IPS (In-Plan Switching) panel, an AH-IPS (Advanced High-Performance In-Plane Switching) panel, a TN (Twisted Nematic) panel, a VA (Vertical Alignment) panel, and an ECB (Electrically-Controlled Birefringence) panel may be used. Here, in the case in which the IPS panel or the AH-IPS panel is used, a common electrode may be formed on the first substrate 112 to form a transverse electric field together with a pixel electrode.

In addition, an alignment film for determining an initial molecular alignment direction of a liquid crystal may be formed on an interface between the first and second substrates 112 and 114 and the liquid crystal layer. A seal pattern may be formed along the edges of the first and second substrates 112 and 114 to prevent leakage of the liquid crystal layer filled between the first and second substrates 112 and 114.

In addition, a polarizing plate for selectively transmitting specific polarized light may be attached to outer surfaces of the first and second substrates 112 and 114.

In addition, a printed circuit board (PCB) may be connected to at least one edge of the liquid crystal panel 110 through a connection member such as a flexible circuit board or a tape carrier package.

The backlight unit 120 may be disposed behind the liquid crystal panel 110 configured as described above.

The backlight unit 120 may include a light emitting diode (LED) assembly 127, a reflection plate 121, a light guide plate 123 that is seated on the reflection plate 121, and an optical sheet 125 disposed on the light guide plate 123.

The LED assembly 127 may include a plurality of LEDs 128 functioning as a light source of the backlight unit 120 and facing a light incidence surface as one side surface of the light guide plate 123, and a PCB 129, on which the plurality of LEDs 128 may be mounted to be spaced apart in one direction on a lower surface thereof.

In the light guide plate 123 on which light emitted from the plurality of LEDs 128 is incident, the light is uniformly spread over a wide area of the light guide plate 123 while the incident light from the plurality of LEDs 128 travels several times through the light guide plate 123 by total reflection, and thus the liquid crystal panel 110 may be provided with uniform surface light.

The reflection plate 121 may be located behind the light guide plate 123 and may reflect light passing through a back surface of the light guide plate 123 toward the liquid crystal panel 110 to improve brightness of the light.

At least one optical sheet 125 may be disposed on the light guide plate 123. For example, a plurality of optical sheets 125 including a diffusion sheet and a light condensing sheet may be disposed on the light guide plate 123. Since the light emitted from the light guide plate 123 is diffused and condensed, a more uniform surface light processed to have high quality may be incident on the liquid crystal panel 110.

The guide mold 130 may be disposed along the three remaining outer side portions of four edges of the backlight unit 120 except for an outer side portion of a light-incident portion, that is, it may be formed to have a "⊏" shape.

The guide mold 130 may be arranged to cover the three remaining side surfaces of the four side surfaces of the light guide plate 123 except for the light incidence surface facing the plurality of LEDs 128.

Meanwhile, the guide mold 130 may be attached and fixed to an upper surface of an outer side portion of a corresponding edge of the reflection plate 121. An adhesive member may be provided on the outer side portion of the edge of the reflection plate 121 to be coupled between the guide mold 130 and the reflection plate 121.

As such, since the guide mold 130 is configured not to be disposed at the light-incident portion at which the plurality of LEDs 128 are disposed, a width of a bezel area in the light-incident portion may be reduced by as much as the guide mold 130 is removed, thereby effectively implementing a narrow bezel.

Particularly, in this embodiment, the graphite film 200 made of graphite may be applied to the light-incident portion of the LCD 100 from which the guide mold 130 is removed.

The graphite film 200 may have an adhesive member formed on an inner surface thereof, may surround the LED assembly 127 and the reflection plate 121, and may be attached to the LED assembly 127 and the reflection plate 121 to fix the LED assembly 127 and the reflection plate 121.

In this regard, for example, after the LED assembly 127 and the light guide plate 123 are assembled, the graphite film 200 may be wrapped in a "⊏" form along an upper surface of the LED assembly 127 (that is, an upper surface of the PCB 129), a rear outer side surface of the LED assembly 127, and a lower surface of the reflection plate 121.

Accordingly, the LED assembly 127 and the reflection plate 121 may be coupled through the graphite film 200 to be firmly fixed.

Furthermore, the graphite film 200 may have excellent heat transfer characteristics. Accordingly, by directly attaching the graphite film 200 to the LED assembly 127, a heat dissipation effect on heat generated by the LED 127 may be effectively realized.

In addition, the graphite film 200 may also have excellent light blocking properties. Thus, by attaching the graphite film 200 to surround the LED assembly 127, it is possible to prevent light leakage to the outside.

Here, the graphite film 200 may contain a light blocking material to further improve its light blocking property.

Meanwhile, the PCB 129 may extend to an upper surface edge of the light incident surface of the light guide plate 123. In this case, the light guide plate 123 may be inserted into a coupling structure of the LED assembly 127 and the reflection plate 121 which are coupled by the graphite film 200.

In other words, in the coupling structure due to the graphite film 200, since the light guide plate 123 is inserted into a space between the lower surface of the PCB 129 of the LED assembly 127 and an upper surface of the reflection plate 121, the light guide plate 123 may be pressed downward and upward by the PCB 129 and the reflection plate 121, respectively, to be fixed.

As such, a fixing structure for the light guide plate 123 may be implemented. Accordingly, positional alignment between the plurality of LEDs 128 and the light guide plate 123 may be stably secured.

Figure 3:
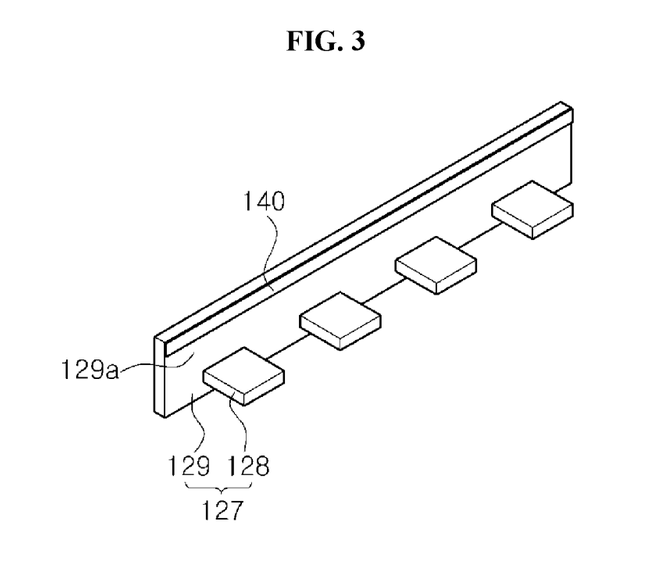
FIG. 3 is a perspective view schematically illustrating a state in which an adhesive member is provided on a lower surface of a printed circuit board (PCB) of a light emitting diode (LED) assembly according to a first embodiment of the present disclosure.

Moreover, in this embodiment, with additional reference to FIG. 3, an adhesive member may be formed on the lower surface of the PCB 129 to more firmly secure the fixing structure between the light guide plate 123 and the LED assembly 127. FIG. 3 is a perspective view schematically illustrating a state in which the adhesive member is provided on the lower surface of the PCB 129 of the LED assembly 127 according to the first embodiment of the present disclosure, and FIG. 3 is a view illustrating the lower surface of the PCB 129.

Referring to FIG. 3 together, an adhesive tape 140 such as a double-sided tape may be adhered to a lower surface of an inner side portion 129a of the PCB 129 located in front of the inner side surface of the plurality of LEDs 128 facing the light incident surface of the light guide plate 123 as the inner side portion 129a of the PCB 129, and the adhesive tape 140 may be formed to extend along a longitudinal direction of the PCB 129.

Such an adhesive tape 140 may be positioned to correspond to an upper edge of the light incident surface of the light guide plate 123, and the PCB 129 may be attached to the light guide plate 123 through the adhesive tape 140 to be coupled thereto.

Accordingly, the LED assembly 127 and the light guide plate 123 may be fixed to each other, and thus the positional alignment between the plurality of LEDs 128 and the light guide plate 123 may be stably secured.

Moreover, by using the adhesive tape 140, an effect of reducing an optical distance of the light guide plate 123 may be also realized.

In this regard, the adhesive tape 140 may have a scattering property. For this reason, since the light emitted from the plurality of LEDs 128 is scattered by the adhesive tape 140 located in front thereof, a light incident angle at the light-incident portion of the light guide plate 123 may be expanded in both directions.

Accordingly, the optical distance, which is a distance at which light superposition occurs from the light incidence surface of the light guide plate 123, may be reduced.

The width of the bezel area may be reduced as a result of reduction in the optical distance, thereby effectively implementing a narrow bezel.

Figure 4:
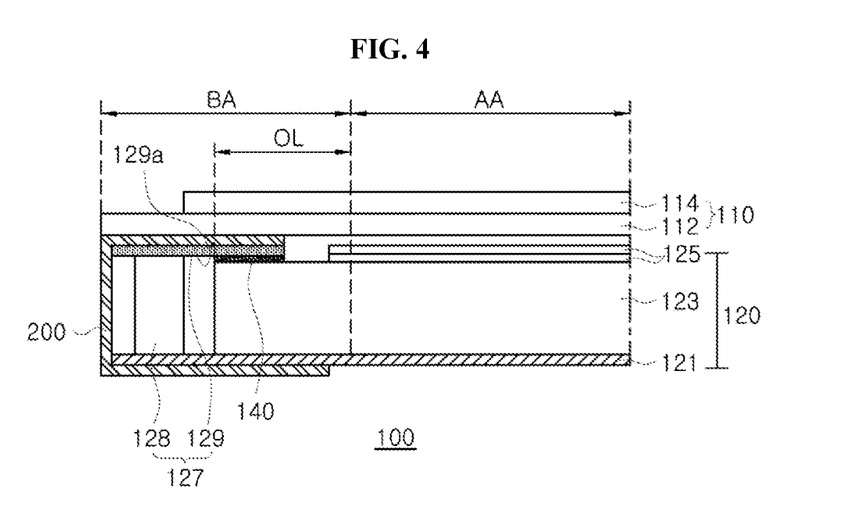
FIG. 4 is a cross-sectional view schematically illustrating a light-incident portion of an LCD according to the first embodiment of the present disclosure.

Hereinafter, a cross-sectional structure of the light incident portion of the LCD of the embodiment will be described in more detail with reference to FIG. 4. FIG. 4 is a cross-sectional view schematically illustrating the light-incident portion of the LCD according to the first embodiment of the present disclosure.

Referring to FIG. 4, in the light-incident portion of the LCD 100, the graphite film 200 is configured to wrap and couple the LED assembly 127 and the reflection plate 121 in a "⊏" shape to fix the LED assembly 127 and the reflection plate 121 together.

A corresponding edge of the liquid crystal panel 110 may be seated on the graphite film 200 to be attached thereto. To this end, an adhesive tape may be formed on an upper surface of the graphite film 200. In order to prevent light leakage from the edge of the liquid crystal panel 110 in the light-incident portion, the adhesive tape on the upper surface of the graphite film 200 may be formed to have a light blocking property. Meanwhile, other edges of the liquid crystal panel 110 other than the light-incident portion may be configured to be seated on and attached to an upper surface of the guide mold 130.

As such, the LED assembly 127 and the reflection plate 121 may be supported and fixed through the graphite film 200. Furthermore, the graphite film 200 may wrap the LED assembly 127 and may separate the LED assembly 127 from the outside. In addition, since the graphite film 200 has light blocking property, it is possible to prevent light leakage to the outside.

As such, when the coupling structure using the graphite film 200 is used, it is possible to implement the fixing function of the LED assembly 127 and the light blocking function implemented by the guide mold even in the case in which the guide mold is not formed in the light-incident portion as in the related art. In addition, a width of a bezel area BA may be reduced according to the removal of the guide mold.

At this time, in order to reduce the bezel area BA by removing the guide mold, a wiring pattern for transmitting a signal to the plurality of LEDs 128 may not be formed or minimized at outer side portions (that is, a portion located behind the plurality of LEDs 128) of the PCB 129, thereby minimizing a width of the outer side portion. It may be desirable to form most of the wiring pattern in front of the plurality of LEDs 128.

Furthermore, since the graphite film 200 has excellent heat dissipation characteristics, a heat dissipation effect on heat generated by the plurality of LEDs 128 may be realized.

In addition, the adhesive tape 140 positioned corresponding to the upper surface edge of the light guide plate 123 may be attached to a lower surface of the inner side portion 129a of the PCB 129 located on inner side portions of the plurality of LEDs 128. The PCB 129 may be attached and fixed to the light guide plate 123 through the adhesive tape 140.

Accordingly, since the LED assembly 127 and the light guide plate 123 are fixed to each other, the positional alignment between the plurality of LEDs 128 and the light guide plate 123 may be stably secured. As a result, backlight characteristics may be secured.

Moreover, since the adhesive tape 140 has light scattering property, the light incident angle may be expanded at the light-incident portion of the light guide plate 123. Accordingly, an optical distance OL, which is a distance from the light incidence surface of the light guide plate 123 to a display area AA, may be reduced. As a result, the width of the bezel area BA may be reduced.

Figure 5:
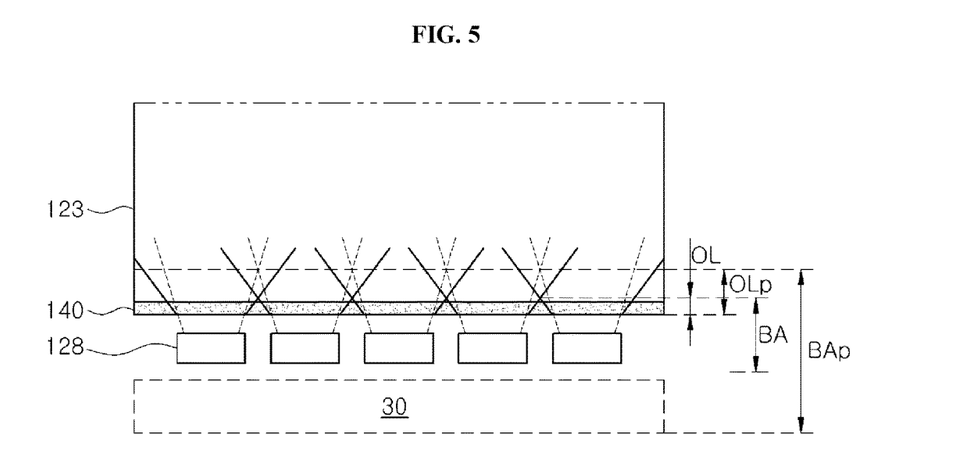
FIG. 5 is a view illustrating a comparison of bezel areas in light-incident portions of the related art LCD and the LCD according to the first embodiment of the present disclosure.

As described above, an effect of decreasing the width of the bezel area BA will be described with reference to FIG. 5. FIG. 5 is a view illustrating a comparison of bezel areas in light-incident portions of the related art LCD and the LCD according to the first embodiment of the present disclosure.

Referring to FIG. 5, in the related art, a width of a bezel area BAp may increase by the width of a guide mold 30 as the guide mold 30 is disposed in a light-incident portion. In contrast, in this embodiment, since the related art guide mold 30 is removed, the width of the bezel area BA may be reduced by approximately the width of the guide mold 30 in comparison to the related art.

Furthermore, in the related art, there is a limitation in reducing an optical distance OLp of the light-incident portion of a light guide plate 123 in accordance with a gap restriction between adjacent LEDs 128. Meanwhile, in this embodiment, since the adhesive tape 140 exists in the light-incident portion of the light guide plate 123 in front of the plurality of LEDs 128, the light scattering characteristics of the adhesive tape 140 may have an effect of expanding the light incident angle at the light-incident portion. Accordingly, it becomes possible to overcome the limitation of the related art optical distance OLp to achieve reduced optical distance OL.

Accordingly, according to this embodiment, since the bezel area BA is reduced, a narrow bezel may be effectively implemented.

Second Embodiment

Figure 6:
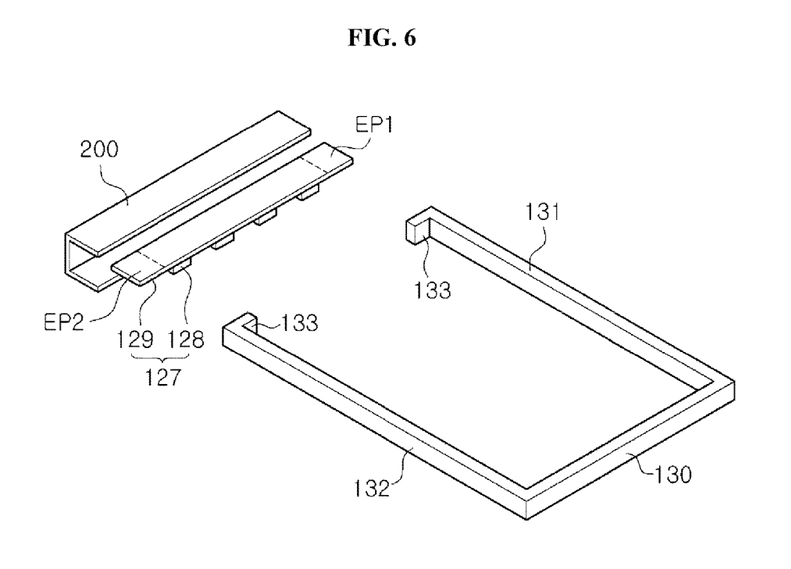
FIG. 6 is an exploded perspective view schematically illustrating a guide mold, an LED assembly, and a graphite film of an LCD according to a second embodiment of the present disclosure.

FIG. 6 is an exploded perspective view schematically illustrating a guide mold, an LED assembly, and a graphite film of an LCD according to a second embodiment of the present disclosure. Furthermore, FIG. 7 is a cross-sectional view of a portion of a light-incident portion of an LCD according to an embodiment of the present disclosure, and a cross-sectional view of a protruding portion of a guide mold.

In the following description, detailed descriptions of the same configurations as the first embodiment will be omitted.

Figure 7:
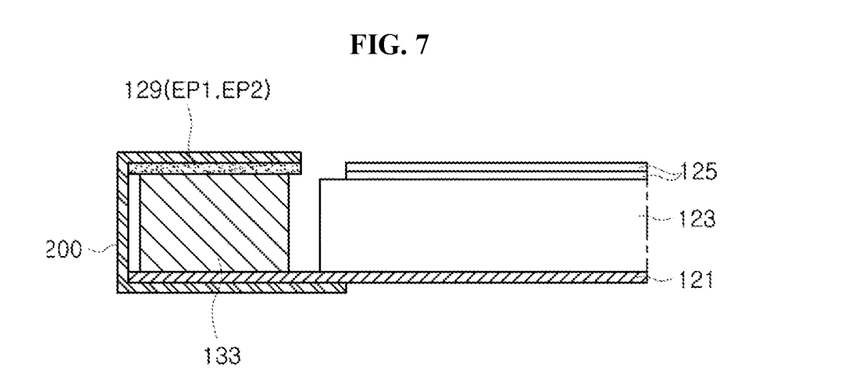
FIG. 7 is a cross-sectional view illustrating a part of a light-incident portion of an LCD according to an embodiment of the present disclosure.

Referring to FIGS. 6 and 7, in the LCD according to this embodiment, a guide mold 130 substantially having a "⊏" shape may have protruding portions 133 protruding inward from both ends thereof. That is, the protruding portions 133 protruding inward from both ends of first and second portions 131 and 132, which are portions of the guide mold 130 located on both sides of a light-incident portion, may be formed.

The protruding portions 133 may be positioned to correspond to lower portions of first and second end portions EP1 and EP2, which are both ends of a PCB 129.

Here, LEDs 128 may not be disposed on the first and second end portions EP1 and EP2 of the PCB 129 corresponding to the protruding portions 133, and the LEDs 128 may be disposed between the first and second end portions EP1 and EP2.

At this time, when coupled via a graphite film 200, the protruding portions 133 may be inserted between the corresponding first and second end portions EP1 and EP2 and a reflection plate 121 disposed thereunder.

In other words, in a coupling structure using the graphite film 200, the protruding portions 133 of the guide mold 130 may be fitted in spaces between the first and second end portions EP1 and EP2 of the PCB 129 and the reflection plate 121 to be inserted thereinto.

Accordingly, the protruding portions 133 may be pressed downward and upward by the PCB 129 and the reflection plate 121, respectively, to be fixed, and consequently the guide mold 130 may be more stably fixed by the fixed protruding portions 133. In addition, the guide mold 130 may be prevented from being deformed through such a fixing structure.

In this regard, as in the first embodiment, since the guide mold 130 having a "E" shape without the protruding portions 133 may be in a state in which ends of the first and second portions 131 and 132 are disconnected from each other, there is a possibility that deformation may occur due to the ends being bent toward an outer side or an inner side of the guide mold 130 due to relatively low supporting force at the ends.

In contrast, the protruding portions 133 protruding inward as in the second embodiment may be disposed below the PCB 129, and the guide mold 130 may be fixed in the form of being pressed by the PCB 129 and the reflection plate 121. Thus, a stable supporting force may be secured with respect to the ends of the first and second portions 131 and 132 of the guide mold 130, thereby preventing the deformation of ends.

As described above, according to embodiments of the present disclosure, a guide mold may be removed from a light-incident portion of an LCD, and a light-incident portion coupling structure may be implemented using a graphite film instead of the guide mold. Accordingly, since a bezel area in the light-incident portion is reduced, a narrow bezel may be effectively implemented and excellent heat dissipation effect may be also realized.

Moreover, by using adhesive tape in front of the LED, it is possible to fix a light guide plate to the light-incident portion coupling structure using the graphite film. In this case, since it is possible to effectively reduce an optical distance of the light-guiding plate, a narrow bezel may be effectively implemented, and positional alignment between the LED and the light guide plate may be also stably realized.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
 a liquid crystal panel;
 a light guide plate disposed under the liquid crystal panel;
 a reflection plate disposed under the light guide plate;
 a light emitting diode (LED) assembly including an LED facing a light incidence surface of the light guide plate and including a printed circuit board (PCB) comprising a first surface, a second surface opposite the first surface, and a third surface perpendicular to and between the first surface and the second surface, the LED mounted on the first surface of the PCB;

a graphite film configured to surround the second surface and the third surface of the PCB, and a lower surface of the reflection plate;

a guide mold comprising:
   a first portion including a first end and a second end, the first portion of the guide mold disposed along a first edge of the light guide plate,
   a second portion that extends from the first end of the first portion of the guide mold, the second portion disposed along a second edge of the light guide plate,
   a third portion that extends from the second end of the first portion of the guide mold, the third portion disposed along a third edge of the light guide plate,
   a first protrusion of the guide mold that extends from an end of the second portion of the guide mold, and
   a second protrusion of the guide mold that extends from an end of the third portion of the guide mold,
   wherein the first protrusion extends from the end of the second portion of the guide mold towards the second protrusion and the second protrusion extends from the end of the third portion of the guide mold towards the first protrusion without the first protrusion and the second protrusion being directly connected with each other.

2. The liquid crystal display device of claim 1, further comprising an adhesive tape configured to attach a portion of the first surface of the PCB that is not mounted with LED to an upper surface of the light guide plate.

3. The liquid crystal display device of claim 1, wherein the guide mold is attached to an upper surface of the reflection plate through an adhesive member.

* * * * *